United States Patent Office 2,879,173

Patented Mar. 24, 1959

2,879,173

PROCESS FOR PREPARING FREE-FLOWING PELLETS OF POLYCHLOROPRENE AND THE RESULTING PRODUCT

Jesse Craig Yacoe, Wilmington, Del., assignor to E. I. du Pont de Nemours and Company, Wilmington, Del., a corporation of Delaware No Drawing. Application March 6, 1956
Serial No. 569,682

6 Claims. (Cl. 117—16)

This invention relates to a method for processing elastomers, and more particularly to a method for producing polychloroprene in the form of small, free-flowing pellets directly from the polychloroprene in latex form.

Elastomers in the form of relatively small particles such as beads or pellets have many advantages over the slabs, sheets and other relatively large masses in which they are available for processing and compounding. Thus, the pellets are more easily and advantageously packaged and stored. They lend themselves to modern continuous operations in which they may be continuously transported, weighed and compounded. Because of their small size, they dissolve much more rapidly and with less power consumption in solvents than slabs, sheets, rods, etc., and are particularly useful in forming dispersions in coal tars and asphalts, which combinations have recently become technically important because of their greatly increased crack resistance and elasticity. Methods are available for putting natural rubber and some other elastomers into the form of crumbs, which fulfil many of the above requirements. These methods, however, are not applicable to soluble polychloroprene since particles of soluble polychloroprene formed under the conditions used for rubber have such a tendency to stick together that they cannot be isolated.

It is therefore an object of the present invention to provide uniform, free-flowing pellets of plastic polychloroprene directly from polychloroprene in latex form, and to provide a simple and economical method for producing such pellets.

According to the present invention, free-flowing pellets of plastic polychloroprene are produced by suspending drops (which may be of minute size) of an aqueous dispersion of polychloroprene in a volatile, water-immiscible organic liquid in which the polychloroprene is insoluble, while it is maintained at below about −20° C., until the drops are completely frozen and coagulated. The resulting frozen pellets are then separated from the suspending liquid, then coated while still frozen with from 5% to 20%, of the weight of the polychloroprene, of a powder which does not react with the polychloroprene at normal atmospheric conditions. The water and any remaining organic liquid are removed as vapor by warming the resulting pellets while they are being agitated.

The invention is applicable to aqueous dispersions of any plastic, soluble polychloroprene, the preparation of which is well known in the art. The dispersing agent employed and the pH of the latex are not critical.

The refrigerated liquid may be chosen from any of the usual organic liquids that are immiscible with water, are non-solvents for polychloroprene below −20° C., and preferably are more volatile than water. Many of these fall in the class of the aliphatic hydrocarbons and fluorinated aliphatic hydrocarbons. The drops of latex to be frozen may be formed by known means before the latex enters the refrigerated liquid, or by directing a stream of latex against the surface of the refrigerated liquid, or by violent agitation of the latex in contact with the refrigerated liquid, or by a combination of these means. The second method will in many cases be found to give the most uniform results and to require the simplest apparatus. Particles varying from much finer than 100 mesh (0.006 inch) to larger than 0.1 inch are readily made by varying the conditions in ways that will be obvious to those skilled in the art, such as by varying the size or velocity of the stream of the latex which is allowed to impinge against the surface of the cooling liquid, or by various means of atomization of the latex prior to contact with the cooling liquid. In any case, however, it is desirable to provide some agitation of the refrigerated liquid to give good heat transfer.

The temperature of the refrigerated liquid should preferably be kept approximately constant. Freezing and coagulation also take place above −20° C. but are usually slower than convenient when much above this temperature. On the other hand, much lower temperatures may be used, but the more rapid coagulation thus obtained usually does not justify the increased expense of operating at these lower temperatures. Temperatures between about −30° and −20° are usually preferred.

The powder used to coat the pellets may be any which will adhere to, and which is not incompatible or reactive with, the polychloroprene surface of the pellets. Examples are talc, starch, soda ash, carbon black and powdered chalk, although it will be apparent that many other powdered materials may be used to serve the same purpose. It is often convenient to use a material such as carbon black which will later be used in compounding the polychloroprene. The pellets lend themselves well to coating with active accelerators, which can then be rapidly and thoroughly incorporated so as to avoid the scorching which would take place if the active accelerators were incorporated by the usual method of milling at elevated temperatures until uniformly mixed, but since much smaller amounts of accelerators are usually employed, they will generally be used in conjunction with the inert powdered materials.

It is essential that the pellets be kept frozen until after they are coated. Otherwise, they coalesce. It is likewise important that the drying be carried out at a temperature which is not high enough to cause the polychloroprene to become insoluble. The temperature of the pellets should therefore preferably not exceed 50° C. While the volatile material is being actively removed, however, the temperature of the warm air used for drying them may obviously be substantially above this temperature without harm. The polychloroprene may be protected against undue reaction by the addition to it while in latex form of rubber antioxidants, by stabilizers known to be specific for polychloroprene, such as the thiurams, disulfides, dithiocarbamates and thiophenols (see U.S. Patents No. 2,259,122 and No. 2,234,211), and by compounds capable of combining with the traces of hydrogen chloride liberated. The process of the present invention is obviously well adapted to continuous operation.

The following examples are given to more fully illustrate the invention. Parts used are by weight, unless otherwise specified.

*Example 1*

One hundred (100) parts of chloroprene, to which were added 3.0 parts of a disproportionated wood rosin (known commercially as Hercules Resin 731) and 0.30 part of dodecyl mercaptan were emulsified at 25° C. in 104 parts of an aqueous solution containing 0.64 part of solid sodium hydroxide, 0.60 part of the sodium salt of naphthalene sulfonic acid-formaldehyde condensation product and 0.30 part of sodium sulfite. The temperature of the emulsion was adjusted to 40° C. and continuous addition of a catalyst solution, consisting of an aqueous solution containing 0.25% of potassium persulfate and 0.0125% of the sodium salt of anthraquinone beta-sulfonic acid, was started. The rate of addition was adjusted to control the polymerization rate so that the temperature of the emulsion was maintained at 40° C. with moderate external cooling. A total of approximately 20 parts of catalyst solution added over a period of 60 to 90 minutes was sufficient to convert about 70% of the chloroprene monomer to polymer, as indicated by the specific gravity rise of the emulsion from 0.973 to 1.053 at 40° C. Catalyst addition then was discontinued and 1.4 parts of a short-stop emulsion was added which consists of 1.0 part of p-tertiarybutyl catechol and 1.0 part of thiodiphenylamine dissolved in 64 parts of benzene and emulsified in 34 parts of an aqueous solution containing 1.0 part of the sodium salt of a naphthalene sulfonic acid-formaldehyde condensation product and 1.0 part of sodium lauryl sulfate. The unchanged chloroprene was removed from the latex by steam distillation, using the turbannular stripper procedure more particularly described in U.S. Patent No. 2,467,769 of Morrow and Parsons. The resulting latex, containing about 38% of polymer, was stabilized against oxidation by adding a dispersion of phenyl-beta-naphthylamine in amount equal to 1% by weight of the polymer and brought to pH 6.5 by means of acetic acid.

This latex was passed by means of an applied air pressure of 30 pounds per square inch through a large hypodermic needle (size No. BD21) forming a fine stream, which was directed onto the surface of about 1400 ml. of petroleum ether (boiling from 30° to 60° C.) which was agitated by an anchor stirrer and cooled externally to —20° C. The stream of latex broke up into droplets on striking the liquid surface. The droplets remained gently suspended in the liquid. When 400 ml. of latex had been added, the suspension was rapidly strained on a 100 mesh screen and the petroleum ether separated was ready for another run. The pellets while still frozen were dusted with 30 g. of powdered talc while being stirred, so that all the particles were thoroughly coated. They were then transferred to a rotary screen drum, in which they were kept in motion while a stream of air at 25° C. was passed over them. After 12 hours the pellets contained only 1.2% total volatile material. They were rounded masses, mostly between 40 to 60 mesh in size, free-flowing and non-tacky. Although they did not coalesce on ordinary handling or storage, they coalesced readily on milling. They dispersed rapidly in solvents such as toluene, and, on warming, in coal tar and asphalt. Three (3) parts in 100 parts of asphalt remarkably improved its elasticity and crack resistance.

*Example 2*

Similar results were obtained by using an emulsifying system in which the base was ammonia. The alkaline latex was coagulated to pellets without acidifying.

Similar pellets were obtained by replacing talc by carbon black, powdered chalk, and soda ash, respectively, in Example 1.

The size of the pellets made as in Example 1 was varied between about 100 mesh and about 20 mesh by varying the velocity and thickness of the stream of latex. Still coarser pellets, up to about 0.1 inch in diameter, were made by forming separate drops of the latex by slow flow through orifices above the liquid surface and by not stirring the refrigerated liquid fast enough to break them up.

I claim:

1. A process for preparing free-flowing pellets of plastic polychloroprene, which comprises suspending drops of an aqueous dispersion of the polychloroprene in a volatile, water-immiscible organic liquid in which the polymer is insoluble at temperatures below —20° C. until the drops are completely frozen and the polychloroprene coagulated, separating the frozen pellets from the suspending liquid, coating them while still frozen with from 5% to 20% of their dry weight of a powder which does not react with the polychloroprene under normal atmospheric conditions, and removing the water and any adhering organic liquid by vaporization by warming the pellets.

2. The process of claim 1 wherein the coating powder for the pellets is carbon black.

3. The process of claim 1, wherein the coating powder for the pellets is talc.

4. The process of claim 1 wherein the water and adhering organic liquid are vaporized by passing a stream of air over the pellets while under agitation.

5. The process of claim 1 wherein the pellets of the plastic polychloroprene are formed in the organic liquid at temperatures of from —20° to —30° C.

6. Uniform, free-flowing pellets up to about 0.1 inch in diameter of plastic polychloroprene of rounded form and coated with from 5% to 20%, based on their dry weight, of a powder which does not react with the polychloroprene under normal atmospheric conditions produced by the process of claim 1.

References Cited in the file of this patent

UNITED STATES PATENTS

| | | |
|---|---|---|
| 1,874,546 | Konrad et al. | Aug. 30, 1932 |
| 2,120,549 | Dike | June 14, 1938 |
| 2,356,896 | Smith | Aug. 29, 1944 |
| 2,419,512 | Vesce | Apr. 22, 1947 |
| 2,457,962 | Whaley | Jan. 4, 1949 |
| 2,463,679 | Buckey | Mar. 8, 1949 |
| 2,550,503 | Turnbull | Apr. 24, 1951 |
| 2,643,234 | Backus | June 23, 1953 |
| 2,670,342 | Verbanc | Feb. 23, 1954 |
| 2,788,297 | Louis | Apr. 9, 1957 |